May 10, 1955  W. D. WILLARD  2,707,888
CIRCULAR SAW CLAMP OR HOLDER
Filed Jan. 22, 1952
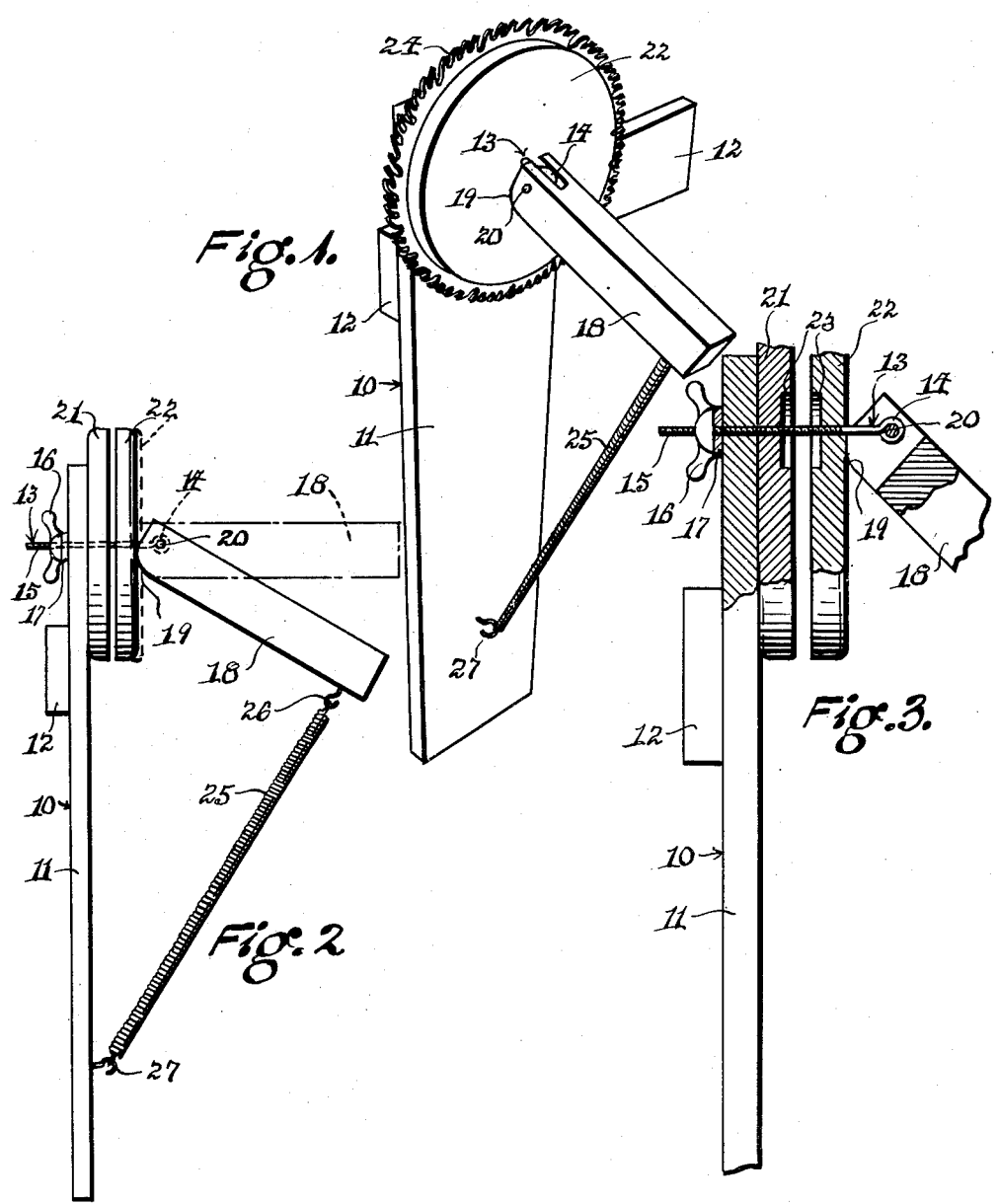

United States Patent Office 2,707,888
Patented May 10, 1955

2,707,888

CIRCULAR SAW CLAMP OR HOLDER

William D. Willard, Avalon, N. J.

Application January 22, 1952, Serial No. 267,619

3 Claims. (Cl. 76—79)

My invention relates to a new and useful circular saw clamp or holder for temporarily clutching a circular saw, either full flat or hollow ground type, during filing and/or setting the teeth thereof and one object of the present invention is to generally improve the construction of devices of this character in order to produce an exceedingly simple structure which is relatively inexpensive, highly efficient in operation and strong and durable.

Another object of this invention is to produce a circular saw clamp or holder comprised of a pair of disc shaped jaws detachably mounted on a spindle for rotation in either direction, said spindle being adjustably and removably attached to a suitable support, and having a spring tensioned cam lever pivoted on the spindle for cooperation with one jaw to urge it towards the other jaw for clamping a circular saw between them.

A further object of the invention is to provide a cam lever of appreciable length pivoted on the forward end of the spindle and coacting with the relatively sliding jaw to move the latter towards a companion jaw, ordinarily non-slidable, and a coil spring detachably connected to an anchorage means and said cam lever for producing a resilient tension on the jaws and work which tension on the jaws and work can be readily and quickly relieved to permit rotation of the jaws and work whereby the jaws and work can be rotated on the spindle without completely releasing the jaws, to intermittently present various areas of the work at a suitable location for operation thereon.

A still further object of this invention is to fashion the inner opposed faces of the disc jaws in a manner to accommodate both the ordinary flat circular saws, which are both filed and set for sharpening purposes, and hollow ground saws which are merely filed for sharpening the same.

With the above and other objects in view this invention consists of the details of construction and combination of elements hereinafter set forth and then designated by the claims.

In order that those skilled in the art to which this invention appertains may understand how to make and use the same, I will describe its construction in detail referring by numerals to the accompanying drawing, forming a part hereof, in which:

Fig. 1 is a perspective view of a circular saw clamp or holder constructed in accordance with my invention and showing a saw clutched between the jaws thereof.

Fig. 2 is a side view thereof with the saw removed and the jaws shown slightly separated for purposes of illustration and also showing the cam lever under spring tension and, in dotted lines, the position of the cam lever when the spring tension on the jaws is temporarily relieved.

Fig. 3 is an enlarged side view with portions of the structure broken away and some parts shown in section to illustrate details of construction.

In carrying out my invention as herein embodied 10 represents a suitable support which, for purposes of illustration only, is shown as including a long but relatively thin and narrow upright 11 with a laterally extending arm 12. This type of support is portable and can be fastened to a post or other rigid member or by means of the arm can be clamped in a vise. It is believed apparent that a permanent support can be employed.

A spindle 13 is adjustably and removably mounted on the support and includes an eye 14 at the forward end of a threaded shank 15 which is projected through the support from the front with a wing nut 16 screwed onto the rear threaded end of said shank for coaction with the back of the support and, if desired, a washer 17 may be interposed between said nut and the support. A conventional eye-bolt can be utilized as the spindle.

The cam lever 18 of appreciable length and any appropriate cross sectional configuration has a convex cam surface 19 merging into the rear end surface and the underneath surface of said cam lever and said cam surface 19 is eccentric to the pivot 20 carried by the cam lever and projecting through the eye 14 of the spindle 13. Preferably the rear end of said cam lever is bifurcated so that both ends of the pivot are supported and the spindle eye is housed.

On the spindle 13 are slidably and rotatably mounted companion disc jaws 21 and 22, the inner one, designated 21, being referred to as the stationary jaw, merely for descriptive purposes, because it normally rests against the face of the support. For the same reason the outer jaw 22 is called the movable jaw since it is generally urged towards the inner jaw as will be presently set forth. Both jaws have central cavities or depressions 23, Fig. 3, to accommodate the thickened hub portion of a hollow ground circular saw while the surrounding opposed inner faces are smooth and flat to clamp any type of circular saw, one of which is shown at 24, Fig. 1, especially adjacent the perimeter thereof inside of the teeth whereby the latter are exposed to be operated upon.

The outer or movable jaw 22 is urged inwardly towards the inner or normally stationary jaw 21, longitudinally of the spindle 13, through the medium of the cam lever 18, by a coil spring 25 having one end attached to the outer end of said cam lever 18, as at 26, and the other end detachably connected to the support 10 at a suitable distance below the location of the spindle 13, as by a hook 27, for temporary or detachable anchorage.

In practice, the lower end of the spring 25 is detached from the hook 27, the nut 16 backed off of the spindle 13 and said spindle, with the cam lever and jaws thereon, removed from the support. Next the inner or stationary jaw 21 is removed from the spindle to permit a circular saw to be positioned on said spindle. The inner jaw is replaced on the spindle, the rear end of the latter projected through the support and the nut 16 screwed onto said rear end of the spindle protruding beyond the back of the support and tightened until the inner jaw engages the face of the support and both jaws contact the saw on opposite faces with a firm or rubbing fit in contradistinction to a tight gripping fit.

The lower end of the spring 25 is again temporarily or releasably anchored to the hook 27 which tensions, stretches or expands said spring so that it acts upon the cam lever to pull the outer end of the latter downwardly and urges the outer or movable jaw, along with the saw, inwardly and longitudinally of the forward end of the spindle, through the medium of the cam surface, until said outer jaw is tight against the saw, the saw tight against the inner or normally stationary jaw and the latter tight against the face of the support.

The saw is now clutched between the clamping jaws with sufficient gripping action to prevent said saw from shifting or the positions of the jaws and said saw being accidentally altered. Some exposed area of the saw teeth can now be worked upon, for example those at the then top of the saw. As soon as work on one area of the saw is completed, the cam lever is raised slightly to release the pressure or tension on the jaws and saw and said jaws are grasped by the hand of the operator and said jaws with the saw therebetween bodily rotated a sufficient distance in either direction to move another area of the saw to the desired location for work thereon. When this has been accomplished the cam lever is released and the spring will again produce the clutching action. These operations are repeated intermittently until the work is completed after which the saw is removed in a manner similar to placing it in the clamp or holder, that is, by removing the spindle from the support and displacing the inner jaw for access to the saw.

The jaws can be made of any desirable or different sizes to accommodate various sizes of saws.

Many of the parts of the device, such as the support, jaws and cam lever, can be produced from metal, plastic, wood or other appropriate material.

From the foregoing it will be apparent that I have provided an exceedingly simple and effective clamp or holder for circular saws having sufficient spring tension to securely hold the work against accidental displacement while permitting temporary release of the tension on the work to allow said work to be shifted without completely displacing the jaws or work which would result in the work having to be again set up for operation thereon.

Of course I do not wish to be limited to the exact details of construction herein shown and described as these may be varied within the scope of the appended claims without departing from the spirit of my invention.

Having described my invention, what I claim as new and useful is:

1. In a circular saw clamp or holder, the combination of a support, a spindle including a threaded shank and an eye at the forward end thereof, said shank slidably projected through the support with a nut screwed thereon and coacting with the back of said support for adjusting the spindle longitudinally of itself, a cam lever of appreciable length pivoted at one end to the spindle eye and having a cam surface eccentric to the pivot and blending into the contiguous end and underneath surfaces of said lever, a pair of similar disc shaped clamping jaws rotatably, slidably and displaceably mounted at their axes on the spindle between the face of the support and the cam lever, one of said jaws being normally in contact with the support and the other directly engaged by the cam surface of the cam lever for sliding said other jaw inwardly along the spindle for clamping a work piece between said jaws, and a coil spring having one end fastened to the outer end of the cam lever and the other end of said spring temporarily anchored to the support below the spindle a sufficient distance to retain said spring expanded to thereby cause the cam lever to urge the jaw engaged by said cam lever with sufficient pressure to clutch a circular saw mounted on said spindle between said jaws, the release of the pressure being accomplished by lifting the cam lever against the action of the spring and thereby freeing the jaws and saw whereby they may be rotated.

2. A clamp or holder for circular saws, comprising a support, a spindle removably mounted in said support and having a nut threaded on the rear end, an eye at the forward end of said spindle, a pair of disc shaped companion jaws slidably, rotatably and removably mounted on said spindle between the support and the spindle eye, a cam lever pivotally connected to said eye and having a cam surface eccentric to the pivot and directly engaging the face of the adjacent disc shaped jaw, and a coil spring attached to the outer end of the cam lever and temporarily anchored to the support in expanded condition.

3. In a clamp for circular saws, a support including front and back faces, the front face being the one which is faced by an operator, a pair of disc shaped cooperating companion jaws, a spindle having an eye at one end and a thread on the opposite end, said spindle projected through the jaws and the support with the threaded end leading, a nut on the threaded end of said spindle and engaging the back of the support to temporarily hold the parts together, said jaws being slidably and rotatably supported by said spindle in front of the support, a cam lever pivotally connected to the eye of the spindle and having a cam surface eccentric to the pivot and directly engaging the face of the adjacent jaw to adjustably move the jaws towards the support when the cam lever is pulled downwardly, and a coil spring attached to the outer end of said cam lever an temporarily anchored to the support in expanded condition to apply a resilient pressure to the jaws.

References Cited in the file of this patent

UNITED STATES PATENTS

| Number | Name | Date |
|---|---|---|
| 120,542 | Shaw | Oct. 31, 1871 |
| 155,819 | Weber | Oct. 13, 1874 |
| 236,335 | Johnson | Jan. 4, 1881 |
| 244,251 | Johnson | July 12, 1881 |
| 831,693 | Wismar | Sept. 25, 1906 |
| 1,064,622 | Dorr | June 10, 1913 |
| 1,084,824 | Shaules et al. | Jan. 20, 1914 |
| 1,658,691 | Shiria | Feb. 7, 1928 |

FOREIGN PATENTS

| 343,893 | France | Oct. 17, 1904 |